United States Patent [19]

Bochman

[11] Patent Number: 5,709,287
[45] Date of Patent: Jan. 20, 1998

[54] IN-LINE INSERT FOR PARKING BRAKE CABLE TO MAINTAIN RESIDUAL TENSION IN THE CABLE SYSTEM

[75] Inventor: Harry Bochman, Seal Beach, Calif.

[73] Assignee: Hi-Shear Automotive Corporation, Torrance, Calif.

[21] Appl. No.: 609,229

[22] Filed: Mar. 1, 1996

[51] Int. Cl.$^6$ ............................ F16D 65/38; F16C 1/10
[52] U.S. Cl. ............... 188/196 B; 188/67; 74/501.5 H; 74/501.5 R
[58] Field of Search ........................ 188/67, 68, 69, 188/106 F, 196 A, 196 B, 196 C, 196 BA, 196 M, 200, 203, 265; 192/4 A, 111 A; 74/500, 501.5 H, 501.5 R, 502.4, 502.6; 267/74

[56] References Cited

U.S. PATENT DOCUMENTS

| | | | |
|---|---|---|---|
| 1,936,530 | 11/1933 | Taylor | 188/196 B |
| 2,160,859 | 6/1939 | Grayson | 188/196 F |
| 2,375,050 | 5/1945 | Tauscher | 74/501.5 H |
| 3,810,397 | 5/1974 | Green | 188/196 F |
| 3,815,713 | 6/1974 | Dietrich | 188/265 |
| 4,379,500 | 4/1983 | Kamino | 188/196 B |
| 4,462,487 | 7/1984 | Warwick et al. | 192/4 A |
| 4,799,400 | 1/1989 | Pickell | 188/196 B |
| 4,841,798 | 6/1989 | Porter et al. | 74/501.5 R |
| 4,892,004 | 1/1990 | Segura et al. | 188/196 B |
| 5,485,762 | 1/1996 | Rothman | 74/501.5 R |

FOREIGN PATENT DOCUMENTS

| | | | |
|---|---|---|---|
| 447572 | 4/1945 | Canada | 188/196 B |
| 356027 | 9/1961 | France | 188/196 B |

Primary Examiner—Matthew C. Graham
Assistant Examiner—Chris Schwartz
Attorney, Agent, or Firm—Donald D. Mon

[57] ABSTRACT

The invention comprises an in-line cable insert for the parking brake cable system of a vehicle which maintains an already established tensile preload by eliminating slack in the cable system which would reduce the preload. The insert comprises a cylinder having an internal chamber, a piston sealed by a diaphragm therein, and a stem connected to the piston comprising one or more sets of ratchet teeth and pawls rotatably connected within the cylinder which engage the ratchet alternatively in half pitch increments. The chamber of the insert is connected to a vacuum source such as the intake manifold of a vehicle engine. The insert maintains the tension in the parking brake cable system when vacuum created in the chamber of the cylinder causes the piston to move downwardly, thereby tightening the brake cable, when the vehicle is started.

5 Claims, 2 Drawing Sheets

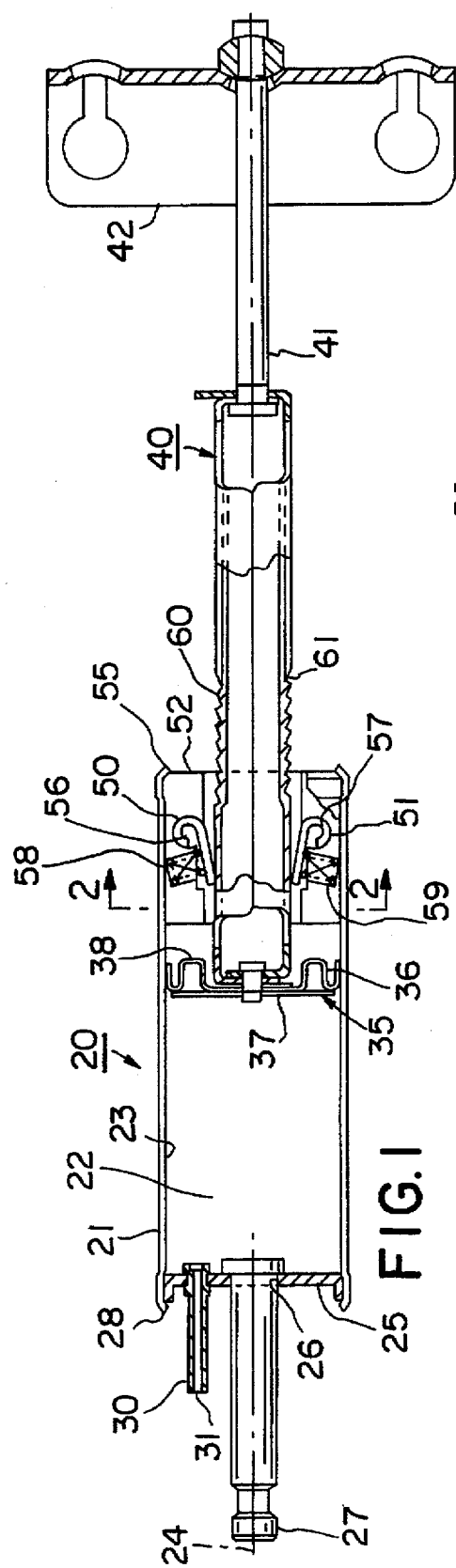
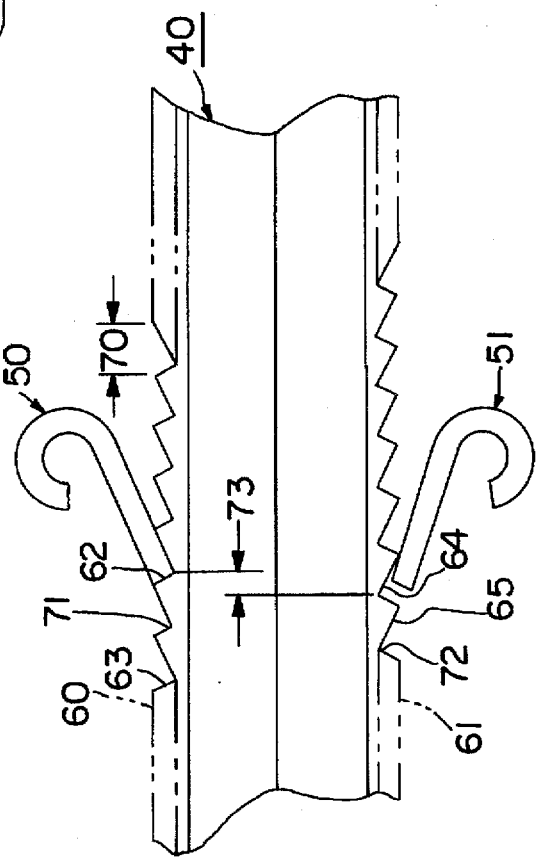
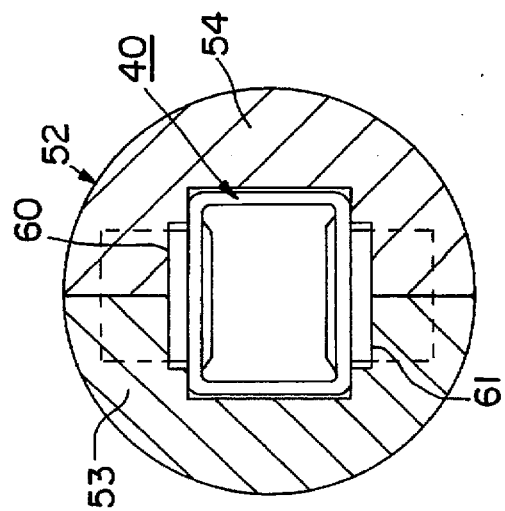

IN-LINE INSERT FOR PARKING BRAKE CABLE TO MAINTAIN RESIDUAL TENSION IN THE CABLE SYSTEM

FIELD OF THE INVENTION

The invention relates a vehicle parking brake system, comprising an insert in an actuating cable system which maintains an already established tensile preload by eliminating slack in the cable system which would reduce the preload.

BACKGROUND OF THE INVENTION

Cable actuated systems, for example vehicle parking brakes, are installed with a residual pre-tension. The purpose of this pre-tension is to remove, at least initially, all slack from the system so that actuating forces can apply the brakes without first taking up slack which may have developed. Cable stretch and wear on the brake linkage are examples of events which can generate slack in the system. Slack in the system results in lessening of the pre-tension in the cables. Accordingly, if the brakes are to be promptly applied with a predetermined force it is necessary to eliminate the slack.

This is a known and pervasive problem, and various means have been suggested to correct it. Generally these require connections to the chassis of the vehicle, or complicated mechanical systems which are not sensitive to the ultimately required tension.

It is an object of this invention to provide an in-line insert for a parking brake cable system that is directly transmissive of an applied force to the linkage, but which at all times is amenable to adjustment of cable length as the consequence of an in-line force derived from a vacuum source, whereby at least a known tensile load will be set in the cable system whenever the vacuum is exerted in the insert. Should slack develop, it will be taken out with the next operation of the engine.

BRIEF DESCRIPTION OF THE INVENTION

An in-line insert for insertion in a cable system that extends from a brake actuator such as a pedal to the brake itself has been developed. No part of it is or needs to be attached to the vehicle itself.

The insert comprises a pneumatic cylinder, and inside the cylinder a piston. The cylinder is adapted to be connected to a vacuum source such as an engine intake manifold. One face of the piston is exposed to vacuum in the cylinder. Its other face is exposed to atmospheric pressure.

The piston carries a stem which is connected to one part of the cable system. The stem includes a rack of ratchet teeth, and a pair of ratchet pawls. The teeth and pawls are so disposed and arranged that an axial pull in the sense of lengthening the insert will be resisted, but the stem can freely be moved in the sense of shortening it to take up system slack.

According to a feature of this invention, the ratchet teeth are spaced apart by pitch lengths, and the pawls are spaced apart by a fraction of said pitch length, or by a whole number of pitch lengths plus a fraction of a pitch length.

The pawls are mounted to the cylinder, so that actuating tensile forces in the cable system are carried through the insert from its cylinder to the stem.

According to the same feature of the invention, a plurality of said tracks is provided, the teeth of the two tracks being axially spaced apart by a fraction of a pitch length, and the pawls being aligned, or spaced apart by a whole number of pitch lengths.

The above and other features of this invention will be fully understood from the following detailed description and the accompanying drawings in which:

BRIEF DESCRIPTION OF THE DRAWINGS

FIG. 1 is a side view of the cable in-line insert, partly in axial cross-section and partly in cutaway cross-section, showing the presently-preferred embodiment of the invention;

FIG. 2 is cross-section taken at line 2—2 in FIG. 1;

FIG. 3 is a schematic side view explaining the action of the pawls in the embodiment of FIG. 1;

DETAILED DESCRIPTION OF THE INVENTION

Figure 4:
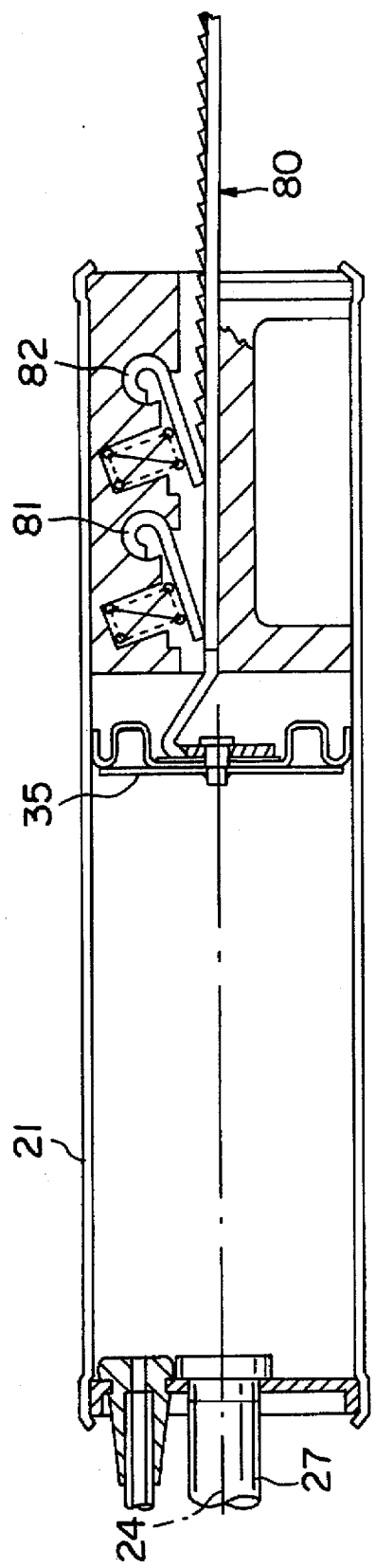
FIG. 4 is a side view, principally in cutaway cross-section showing another embodiment of the invention.
Figure 5:
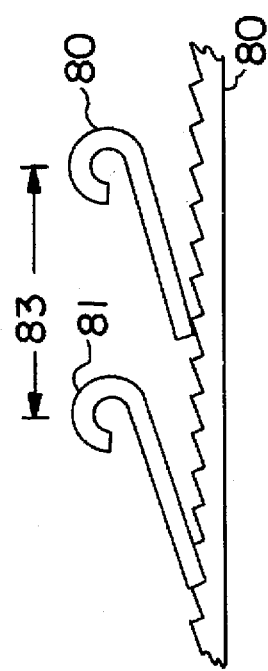
FIG. 5 is a schematic side view explaining the action of the pawls in the embodiment of FIG. 4.

An in-line insert 20 according to this invention is shown in FIG. 1. It is intended to be placed in a cable system that extends from a brake lever (not shown) to brake actuators at the wheels (also not shown). Both ends can be connected to the ends of cable segments, or one can be connected to structure such as the brake lever, and the other to a cable end. The term "in-line" means that this device is directly in the tension force line from the lever to the actuator, and need not be separately anchored to the chassis.

The insert has a body 21 with an internal cylinder 22 having a cylindrical wall 23 extending along its central axis 24. An end plug 25 has a central aperture 26 which passes a headed connector pin 27 that is adapted to be connected to another part of the cable system, perhaps to the lever, or to a cable end. This plug closes the cylinder at end 28.

A tube 30 is fitted in the end plug. It has a central passage 31 opening into the cylinder. It is adapted to be connected to a hose (not shown) which in turn will be connected to a source of vacuum, perhaps an engine manifold.

A piston 35 is slidably fitted in the cylinder. It includes a flexible seal 36 which separates the two #aces 37,38 of the piston from one another. Face 37 will be exposed to vacuum in the closed end 28 of the cylinder, and face 38 will be vented to atmosphere. A differential pressure across the piston will tend to move it axially.

A stem 40 is connected to the piston, and extends beyond the body to be connected into the cable system. A connector bolt 41 is carried by the stem at its free end. The bolt is in turn attached to a conventional equalizer plate 42. Cables are to be connected to the plate and to the brake actuator of two rear wheels.

A feature of the invention is the provisions of two pawls 50,51. A carrier 52 made of two parts 53,54 is fitted in end 55 of the cylinder. It slidably mounts stem 40, to permit its axial sliding motion. It allows venting of face 38 of the piston. The carrier is held in the cylinder by crimping end 55.

Pins 56,57 rotatably mount pawls 50,51. Springs 58,59 bias the ends of the pawls toward and against ratchet racks 60,61.

The ratchet teeth are sawtooth types, having locking faces 62,63 and release faces 64,65. They are formed as a progression of parallel teeth, all of which lie in planes normal to the central axis.

As can best be seen in FIG. 3, the release surfaces will allow the stem to move to the left in FIG. 1, which relates to shortening of the cable system, or more precisely to the elimination of slack in the system. Movement of the stem to the right in FIG. 1 will be prevented by one or the other of the pawls, as will now be described.

As shown in FIG. 3, every tooth has the identical pitch length 70. It is an object of this invention to use relatively large pitch dimensions for strength, but to enable adjustments to be made in smaller increments. For this purpose, either the racks may be axially shifted relative to one another with the pawls in registration, or they may be in registration, but then the pawls will be axially shifted relative to one another.

Observe in FIG. 3 that the roots 71,72 of the teeth in racks 56 and 57 are axially shifted by one-half pitch 73, and that the pawls are axially in registration. Thus, when one pawl is latched, the other is not, but after movement of the stem by one-half pitch, the situation will be reversed, with the formerly latched pawl released. Thus, the stem can pull in slack in one-half pitch increments. Additionally, the use of multiple pawls provides a desirable redundancy.

It may be preferred to have more or fewer racks. For example, as shown in FIG. 4, only one rack 80 may be provided, with two pawls 81,82 reacting with the same rack. These pawls will be spaced apart by a spacing 83 representing a whole number of pitches plus one-half pitch. The remainder of the structure is identical and the same part numbers will be used for them.

It may also be desired to have four racks. This will permit even smaller adjustment increments, because the teeth or the pawls may be shifted by only one-fourth of a pitch length.

The most practical embodiment is shown in FIG. 1. While the racks are shown on a flat stem, they may instead be formed on a round stem, and instead of flat teeth, the teeth may be formed as part of a thread, the ends of the pawls being appropriately shaped.

As best shown in FIGS. 1 and 3, the racks may be formed on flat stocks, and the ends bent appropriately to be joined in the desired arrangement. This greatly simplifies the production of these parts.

The installation and operation of the insert are straightforward. The initial pre-installation and pre-vacuum position of the insert is shown in FIG. 1. It is connected into the system, and the stem is shoved toward the cylinder until the system is tight. This will advance the racks into contact with the pawls. Then the engine is started. Vacuum from the manifold is transmitted to the cylinder, and the piston and stem will be drawn to the left in FIG. 1 until the tension in the stem is equal to the force across the piston. One of the pawls will lock, and the cable system is tight and will be held in the adjustment by one of the pawls. Should slack later occur, then it will be taken out by the insert during the next operation of the engine.

The operation of the embodiment of FIG. 4 is identical to that of FIG. 1, except that the two pawls operate on the same rack, being spaced apart from one another by a whole number of pitches plus a fraction of a pitch, in this case the fraction being one-half.

This adjustment device operates without supervision, and is effective to make any necessary adjustment whenever there is a vacuum in the manifold. The force exerted by the system is a function of the cross-section area of the piston, of atmospheric pressure, and of the vacuum pressure. Suitable dimensions for the piston and for the pitch of the teeth are well within the skill of the designer, bearing in mind the expected ranges of the pressures involved.

This invention is not to be limited by the embodiments shown in the drawings and described in the description, which are given by way of example and not of limitation, but only in accordance with the scope of the appended claims.

I claim:

1. An in-line insert to remove slack from a parking brake cable system, comprising:
   a body having an internal cylinder with a central axis and an internal axial wall, said cylinder having one closed end;
   a piston slidably and fluid sealingly fitted in said cylindrical wall, said piston having a pair of opposite faces, one facing into said closed end of the cylinder, and the other exposed to atmosphere;
   a rack of ratchet teeth extending axially along a stem attached to said piston, each said teeth having a locking face and a release face, each of said teeth having a pitch dimension;
   a pair of pawls mounted to said body, each pawl being adapted to engage against the locking faces, and to pass the teeth along the release faces, said pawls being spaced apart by e a fraction of a whole number of pitches, whereby only one pawl is engaged at a time;
   means to connect said cylinder to a source of vacuum, whereby vacuum may be exerted on the face of the piston which is in said closed end and opposite from the stem;
   whereby with the insert adapted to be connected into a cable system by connection of the stem and the body therein, exertion of vacuum in the closed end of the cylinder causes the piston to move toward said closed end, drawing the teeth past the pawls, said pawls latching the stem against reverse movement.

2. An in-line insert to remove slack from a parking brake cable system, comprising:
   a body having an internal cylinder with a central axis and an internal axial wall, said cylinder having one closed end;
   a piston slidably and fluid sealingly fitted in said cylindrical wall, said piston having a pair of opposite faces, one facing into said closed end of the cylinder, and the other exposed to atmosphere;
   a plurality of racks of ratchet teeth extending axially along both side of a stem, each of said teeth having a locking face and a release face, each of said teeth having a pitch dimension, the teeth of each rack being axially offset with the teeth of another rack.
   an equal plurality of pawls mounted to said body, each pawl being adapted to engage against the locking faces of the teeth of a respective rack, and to pass the teeth along the respective release faces, said racks being spaced apart by a fraction of a whole number pitches, whereby only one pawl is engaged at a time;
   means to connect said cylinder to a source of vacuum, whereby vacuum may be exerted on the face of the piston which is in said closed end and opposite from the stem;
   whereby with the insert adapted to be connected into a cable system by connection of the stem and the body therein, exertion of vacuum in the closed end of the cylinder causes the piston to move toward said closed end, drawing the teeth past the pawls, said pawls latching the stem against reverse movement.

3. An insert according to claim 2 in which there are two of said racks and two of said pawls, and said fraction is one-half.

4. An in-line insert to remove slack from a parking brake cable system, comprising:

a body having an internal cylinder with a central axis and an internal axial wall, said cylinder having one closed end;

a piston slidably and fluid sealingly fitted in said cylindrical wall, said piston having a pair of opposite faces, one facing into said closed end of the cylinder, and the other exposed to atmosphere;

a plurality of racks of ratchet teeth extending axially along both side of a stem, each of said teeth having a locking face and a release face, each of said teeth having a pitch dimension;

an equal plurality of pawls mounted to said body, each pawl being adapted to engage against the locking faces of the teeth of a respective rack, and to pass the teeth along the respective release faces, said racks being spaced apart by a fraction of a whole number of pitches, whereby only one pawl is engaged at a time;

means to connect said cylinder to a source of vacuum, whereby vacuum may be exerted on the face of the piston which is in said closed end and opposite from the stem;

whereby with the insert adapted to be connected into a cable system by connection of the stem and the body therein, exertion of vacuum in the closed end of the cylinder causes the piston to move toward said closed end, drawing the teeth past the pawls, said pawls latching the stem against reverse movement.

5. An insert according to claim 4 in which there are two of said racks and two of said pawls, and said fraction is one-half.

\* \* \* \* \*